(12) United States Patent
Henneau et al.

(10) Patent No.: US 11,873,190 B2
(45) Date of Patent: Jan. 16, 2024

(54) SYSTEM FOR CONVEYING PASSENGERS, METHOD FOR OPTIMIZING THE OPERATION OF A SYSTEM FOR CONVEYING PASSENGERS

(71) Applicant: Inventio AG, Hergiswil (CH)

(72) Inventors: Philippe Henneau, Zürich (CH); Amos Schaub, Wettingen (CH); Kurt Heinz, Buchs (CH)

(73) Assignee: INVENTIO AG, Hergiswil (CH)

( * ) Notice: Subject to any disclaimer, the term of this patent is extended or adjusted under 35 U.S.C. 154(b) by 330 days.

(21) Appl. No.: 17/250,524

(22) PCT Filed: Sep. 18, 2019

(86) PCT No.: PCT/EP2019/075044
§ 371 (c)(1),
(2) Date: Feb. 1, 2021

(87) PCT Pub. No.: WO2020/058349
PCT Pub. Date: Mar. 26, 2020

(65) Prior Publication Data
US 2021/0300721 A1 Sep. 30, 2021

(30) Foreign Application Priority Data
Sep. 18, 2018 (EP) .................................. 18195259

(51) Int. Cl.
*B66B 1/30* (2006.01)
*B66B 5/00* (2006.01)
*B66B 25/00* (2006.01)

(52) U.S. Cl.
CPC ............ *B66B 1/302* (2013.01); *B66B 5/0037* (2013.01); *B66B 25/003* (2013.01)

(58) Field of Classification Search
CPC ...... B66B 1/302; B66B 5/0037; B66B 25/003; B66B 5/0006; B66B 1/34; B66B 25/00; Y02B 50/00
See application file for complete search history.

(56) References Cited

U.S. PATENT DOCUMENTS

2005/0263355 A1 12/2005 Kostka
2007/0295566 A1 12/2007 Lindegger
(Continued)

FOREIGN PATENT DOCUMENTS

CN 1392667 A 1/2003
CN 101088896 A 12/2007
(Continued)

*Primary Examiner* — Jeffrey Donels
(74) *Attorney, Agent, or Firm* — William J. Clemens; Shumaker, Loop & Kendrick, LLP

(57) ABSTRACT

A passenger conveying system includes a passenger conveyance installation designed as an elevator, escalator or moving walkway, a main energy supply supplying the passenger conveyance installation with electrical energy, a main switch for disconnecting the passenger conveyance installation from the main energy supply, which main switch has an input side connected to the main energy supply and an output side connected to the passenger conveyance installation. The system includes a measuring device with a sensor for measuring an electrical parameter, a converter which has a direct current side and an alternating current side, an energy store electrically connected to the direct current side of the converter, a control device for controlling the converter, wherein the sensor is electrically and/or electromagnetically connected on the input side of the main switch to the main energy supply and the alternating current side of the converter is electrically connected to the main energy supply.

14 Claims, 9 Drawing Sheets

13 MODULAR UNIT
14 MEASURING DEVICE
16 CURRENT SENSOR
18 COMMUNICATION DEVICE
26 CONVERTER
32 ENERGY STORE
34 CONTROL DEVICE

(56) References Cited

U.S. PATENT DOCUMENTS

| | | | |
|---|---|---|---|
| 2014/0166407 A1 | 6/2014 | Sonnenmoser | |
| 2015/0377968 A1 | 12/2015 | Lustenberger | |
| 2018/0215578 A1 | 8/2018 | Kusserow et al. | |
| 2018/0327215 A1* | 11/2018 | Kattainen | B66B 1/308 |
| 2019/0263628 A1* | 8/2019 | Sonnenmoser | B66B 5/0018 |

FOREIGN PATENT DOCUMENTS

| | | |
|---|---|---|
| CN | 102123930 A | 7/2011 |
| CN | 103863921 A | 6/2014 |
| CN | 104870353 A | 8/2015 |
| DE | 102008002839 A1 | 12/2008 |
| EP | 0645338 A2 | 3/1995 |
| EP | 2500309 A1 | 9/2012 |
| EP | 3336998 A1 | 6/2018 |
| JP | 2016084209 A | 5/2016 |
| KR | 200000020216 A | 4/2000 |
| WO | 2009065999 A1 | 5/2009 |
| WO | 2011105959 A1 | 9/2011 |
| WO | 2011153401 A2 | 12/2011 |
| WO | 2014090623 A1 | 6/2014 |
| WO | 2017016876 A1 | 2/2017 |

* cited by examiner

13 MODULAR UNIT
14 MEASURING DEVICE
16 CURRENT SENSOR
18 COMMUNICATION DEVICE
26 CONVERTER
32 ENERGY STORE
34 CONTROL DEVICE

13 MODULAR UNIT
14 MEASURING DEVICE
16 CURRENT SENSOR
18 COMMUNICATION DEVICE
26 CONVERTER
32 ENERGY STORE
34 CONTROL DEVICE

SYSTEM FOR CONVEYING PASSENGERS, METHOD FOR OPTIMIZING THE OPERATION OF A SYSTEM FOR CONVEYING PASSENGERS

FIELD

The invention relates to a system for conveying passengers, as well as a method for optimizing the operation of a system for conveying passengers.

BACKGROUND

It is known in systems for conveying passengers, in particular in elevator and escalator installations, that the latter are in operation in different operational states and these operational states differ with regard to an energy reference profile.

A method and a device for determining an operational state of an elevator installation is known from WO 2017 016 876 A1. For this purpose, a current profile of the elevator installation is determined and at least one current profile segment of the acquired current profile is identified and then, based on a comparison of the current profile segment with at least one reference sample, an operational state of the elevator installation is determined.

A drawback with the known method and the known device for determining an operational state of an elevator is that access to the elevator installation is required for the method or the fitting of the device.

It is the problem of the present invention to create a system for conveying passengers which avoids the drawbacks of the prior art and in particular creates a method for optimizing the operation of the system for conveying passengers, which method can also be used without access to the passenger conveyance installation.

SUMMARY

The problem is solved by a system for conveying passengers, and by a method for optimizing the operation of the system for conveying passengers described herein.

According to the invention, the system for conveying passengers comprises at least one passenger conveyance installation constituted as an elevator, an escalator or a moving walkway in a building. The passenger conveyance installation comprises in particular a first control device for controlling the passenger conveyance installation. The system further comprises a main energy supply in the building for supplying the passenger conveyance installation with electrical energy. The system further comprises a main switch for disconnecting the passenger conveyance installation from the main energy supply. The main switch is arranged in the building and is provided for disconnecting the passenger conveyance installation from the main energy supply. The main switch has an input side and an output side. The input side is connected to the main energy supply. The output side is connected, in particular directly, to the passenger conveyance installation. The system also comprises a measuring device with a sensor for measuring an electrical parameter. According to the invention, the sensor is connected electrically and/or electromagnetically at the input side of the main switch.

The electrical parameter is for example a temporal profile of an electrical power, a temporal profile of an electrical voltage or preferably a temporal profile of an electrical current or a combination of the aforementioned profiles. The electrical parameter can have different electrical magnitudes with different temporal resolutions.

The sensor can have an input and an output, so that the conductors (phase and/or neutral conductors), which lead to the input side of the main switch, can be connected up by cable from the main energy supply to the input of the sensor. The electrical parameter of the main energy supply can thus be measured in the sensor. The conductors of the input side are then correspondingly connected up at the output of the sensors after the measurement by further cables to the input side of the main switch. In this embodiment, therefore, the sensor is connected electrically in series to the components energy supply, main switch and passenger conveyance installation, wherein the sensor is fitted, in the direction of the energy flow, before the main switch, i.e. on the input side of the main switch, i.e. between the main energy supply and the main switch.

In another embodiment, the sensor can measure the electrical parameter electromagnetically without interruption of the conductors. In this embodiment, the sensor is thus for example a Hall-effect current sensor. In this embodiment, the conductors of the main energy supply, which lead to the input side of the main switch, are passed through the Hall-effect current sensor, so that the electrical parameter can be measured contactlessly. The location of the measurement in this embodiment is the same as in the previously described embodiment.

In a further embodiment, the sensor is designed as a combination of the embodiment described above and measures the electrical parameter electrically, i.e. also electromagnetically.

Above and in the following, a sensor is understood to mean a single sensor or also a group of sensors. A sensor can thus contain for example three independent measuring devices, so that the sensor can measure all three phase conductors of the main energy supply. A sensor can also be a group of sensors for a single phase conductor. For example, a sensor can comprise a voltage sensor and current sensor or also a plurality of voltage and current sensors. For example, a sensor can comprise three current sensors and three voltage sensors and thus comprise a current sensor and a voltage sensor for each of the three phase conductors of the main energy supply.

Passenger conveyance installations are connected to the main energy supply during the commissioning. An area of responsibility is assigned to the manufacturer of the passenger conveyance installation and/or the service representative, to which he alone has access and is responsible for the proper functioning of the installation within this area. In a first case, the area of responsibility, as viewed in the direction of the energy flow, starts after the output side of the main switch. The area thus comprises the electrical conductors, which are fitted at the output side of the main switch for supplying the passenger conveyance installation with energy. In this case, the area does not include what lies before the output side of the main switch, as viewed in the direction of the energy flow. In particular, the area does not include the main switch and also not the input side of the main switch, or the conductors which connect the energy supply to the input side of the main switch. In a second case, the area of responsibility starts from the input side of the main switch, as viewed in the direction of the energy flow. In this case, therefore, the area includes everything which lies after the input side of the main switch, as viewed in the direction of the energy flow. The area thus includes the main switch, the output side of the main switch and the conductors which connect the output side of the main switch to the passenger conveyance installation. Third parties who neither produced the passenger conveyance installation nor have responsibility for its maintenance do not have access to this area.

The fitting of the sensor of the measuring device to the input side of the main switch thus proves to be advantageous, since the sensor is positioned in the system in such a way that the area of responsibility does not need to be made accessible and does not have to be changed. This system can thus be provided with any passenger conveyance installation by fitting a measuring device, without details concerning the passenger conveyance having to be made available. There is also no need for permission from the person responsible for the passenger conveyance installation. The system thus enables the measurement/monitoring of passenger conveyance installations and thus the acquisition of information concerning these passenger conveyance installations, which would not otherwise be accessible to a third party.

According to a first aspect of the invention, the system also comprises a converter and a control device. The converter has a direct current side and an alternating current side. The system also comprises an energy store. The energy store is electrically connected to the direct current side of the converter. The further control device is in particular a control device which is different from the first control device for controlling the passenger conveyance installation. The system also comprises a further control device for controlling the converter. According to the invention, in this first aspect of the invention the alternating current side of the converter is electrically connected to the main energy supply at the input side of the main switch.

The system according to the first aspect of the invention thus makes it possible to supply energy from the energy store at the input side of the main switch and thus to assume at least a part of the load of the main energy supply. The energy required by the main energy supply is thus reduced at least temporarily.

It proves to be advantageous that, depending on the state of the main energy supply, the supply to the system can thus take place at least temporarily and at least partially by means of the energy store. With a corresponding control, the energy consumption of the system from the main energy supply can thus be adapted for example to the supply of energy present in the main energy supply. The main energy supply can thus be loaded or relieved of load depending on the state, i.e. depending on supply/demand and therefore depending on the tariff.

According to a second aspect of the invention, the system further comprises a communication device for transmitting the measured electrical parameter to an analysis device.

The system according to the second aspect of the invention enables the communication of the electrical parameter to an analysis device for evaluating the electrical parameter with regard to the state of the passenger conveyance installation. It proves advantageous that the state of the passenger conveyance installation can thus be determined and monitored without direct access to the passenger conveyance installation.

Above and in the following, a communication device is a cable and/or a cableless device for transmitting data. The analysis device can be constituted in the system, set apart from the system or partially integrated into the system and partially set apart therefrom.

Both the first and also the second aspect of the invention are reliant on the measurement of the electrical parameter at the input side of the main switch. In a preferred embodiment according to the first aspect and/or the second aspect of the invention, the system comprises at least two passenger conveyance installations. The main energy supply supplies the at least two passenger conveyance installations with electrical energy. The at least two passenger conveyance installations can thus be disconnected from the main energy supply by means of the main switch.

In this embodiment, the system comprises a main switch for two passenger conveyance installations. Such an embodiment is present for example when a main energy supply supplies two passenger conveyance installations present for example in the same building. The electrical parameter at the input switch is in this case the sum of the electrical parameters of the two passenger conveyance installations.

It proves advantageous that, with the measurement of an electrical parameter which is the sum of the electrical parameters of the first passenger conveyance installation and an electrical parameter of the second passenger conveyance installation, the energy consumption of the two passenger conveyance installations from the main energy supply can, according to the first aspect of the invention, thus be influenced at least temporarily and at least partially. According to the second aspect of the invention, this embodiment enables the determination of the state of the first and second passenger conveyance installation with a single measuring device. With this embodiment, only one measuring device has to be present for two elevator installations, and according to the first aspect only one converter and one energy store and according to the second aspect only one communication device. This enables a cost-effective implementation of the first and/or second aspect of the invention.

In a preferred embodiment according to the first aspect of the invention, the converter permits a bidirectional energy flow.

A converter which permits a bidirectional energy flow enables an energy flow from the energy store to the input side of the main switch as well as a reverse energy flow from the input side of the main switch to the energy store. This enables the supplying of energy from the energy store into the passenger conveyance installation and/or the main energy supply and therefore the at least temporary and at least partial relief of the load on the main energy supply. The reverse energy flow from the input side of the main switch to the energy store enables the charging of the energy store with energy from the main energy supply without a further converter being required for this. This enables a compact and cost-effective design of the system.

If the passenger conveyance installation is designed as an installation which feeds back energy (generator operation of the electrical machine for example during braking), the invention according to the first aspect thus permits the storage of this energy in the energy store. This is advantageous, since the energy can thus be stored in the energy store and used at a later time for the operation, for example for the standby operation of the installation. The installation thus consumes less energy from the main energy supply. In the case of many main energy supply systems, a compensated recovery of energy is only possible from a certain power. Passenger conveyance installations often lie below this power limit with their energy recovery power, so that whilst they feed back energy into the main energy supply, the latter is however not compensated. With the intermediate storage of the energy in the energy store and the subsequent supply of this energy and the associated lower energy consumption of the installation over a certain period, a cost-reducing use of the recovered energy is thus enabled. Energy recovery installations can thus be operated more cost-effectively.

In a preferred embodiment of the invention according to the first aspect of the invention, the converter is constituted as a monophase converter. This permits a cost-effective implementation of the first aspect of the invention and yet enables the supplying of the standby operation with the energy store and the monophase converter, since the standby operation runs predominantly over one phase.

Such monophase converters are well known to the person skilled in the art. In an embodiment, the converter enables the connection of renewable energy sources to the main energy supply. In this embodiment, the converter comprises, apart from a connection for the energy store, also a connection for an alternative energy source. The energy of this energy source can be fed in via the energy store or also directly at the input side of the main switch into the main energy supply.

In a preferred embodiment according to the second aspect of the invention, the system comprises an analysis device for evaluating the measured electrical parameter with regard to the state of the passenger conveyance installation.

The analysis device receives from the communication device the electrical parameters measured by the measuring device. The analysis device derives from the measured electrical parameters an indication of the state of the passenger conveyance installation. The analysis device can ascertain the state of the passenger conveyance installation in particular on the basis of the temporal profile of the electrical parameter. For example, the profile (amplitude, duration, gradient) of the electrical parameter can change with the ageing of the components which give rise to it. In particular, the duration (pulse length of the electrical parameter) may be lengthened for a specific operational state or the amplitude of the electrical parameter may change on account of malfunctions. The comparison of the target profile of the electrical parameter and the measured profile and the subsequent interpretation of the differences is carried out by the analysis device.

On the basis of the electrical parameter, the analysis device thus makes it possible to monitor the state of the passenger conveyance installation and to detect wear, malfunctions. Since the electrical parameter is measured, as viewed from the energy flow, before the main switch, i.e. at the input side of the main switch, the analysis device can monitor the state of the passenger conveyance installation without access to the installation being required for this purpose.

In an embodiment, the analysis device is part of the system and is responsible solely for measurement values of the measuring device of this system. In this embodiment, the analysis device is constituted in the vicinity of the measuring device.

In an alternative embodiment, the system comprises a central analysis device set apart from the system for evaluating the measured electrical parameter with regard to the state of the passenger conveyance installation. In this embodiment, the analysis device is set apart from the passenger conveyance installation and/or the main energy supply and is connected via the communication device to the measuring device.

In this connection, central means that the analysis device is constituted at a location independent of the rest of the system. In this embodiment, the analysis device is part of a plurality of systems, as described above and in the following. The connection leading from the communication device is advantageously cableless. This embodiment enables the use of the same analysis device for a multiplicity of systems and is therefore a cost-effective system. Furthermore, a central analysis device permits the measured electrical parameters to be brought together and therefore a better database from a plurality of systems for the analysis of the operational state of an individual passenger conveyance installation.

In a preferred embodiment according to the second aspect of the invention, the passenger conveyance installation is a hydraulic elevator installation.

In the case of hydraulic elevator installations, the measured electrical parameter contains a larger information content in respect of the operational state of the installation than is the case with an electrical parameter of a traction elevator installation or escalator. In particular, in the case of a hydraulic elevator it can be determined on the basis of the current of the main energy supply whether the elevator installation is making an upward or downward movement. Only the upward movement requires a drive current in the case of hydraulic elevator installations. The downward movement can take place without the consumption of electrical energy, as a result of which the latter can be differentiated from the upward movement. Door closing and door opening pulses can be detected in both cases at the start and finish, so that a downward movement can also be detected as a movement.

In an embodiment according to the first and/or the second aspect of invention, the measuring device comprises two sensors. In a particularly preferred embodiment, the measuring device comprises three sensors. In a preferred embodiment, the measuring device comprises four sensors. Each of the sensors is connected at the input side of the main switch in each case to one of a plurality of phase conductors or a neutral conductor of the main energy supply.

In the embodiment with four sensors, each of the conductors of the three-phase main energy supply, i.e. each of the three phase conductors and the neutral conductor, can be detected by the measuring device. The measuring device thus enables the detection of the electrical parameter in each conductor of the main energy supply. This enables the acquisition of a maximum information content. The measurement of the electrical parameter in only one conductor carries the risk that information which is contained solely in the electrical parameter of the other conductors escapes the measuring device. A standby operation of the passenger conveyance installation can thus be supplied for example only via one conductor of the main energy supply. In this case, the loads which are active in the standby operation of the passenger conveyance installation are thus supplied through one phase conductor of the energy supply. The measurement at other conductors would mean that information concerning the standby operation escapes the measuring device. If the electrical parameter is for example the electrical current in one conductor, the measurement at only the neutral conductor permits the detection of an unbalanced loading of the energy supply. If the energy supply is loaded in a balanced manner, however, the electrical current in the neutral conductor is zero and therefore no information can be derived from the current profile. In this case, the measurement does not provide any indication with regard to, for example, the energy requirement of the passenger conveyance installation or its state. If a measurement is carried out on all four conductors, i.e. on all three phase conductors of the three-phase alternating current system and on the neutral conductor, the acquisition of a maximum information content regarding the electrical supply to the passenger conveyance installation is enabled. It is advantageous with this embodiment that all the conductors comprise a sensor and fitting of a sensor to an incorrect conductor is thus eliminated.

In the embodiment with three current sensors, each of the phase conductors of the three-phase energy supply can for example comprise a sensor. One sensor less is required without information being lost, unlike a system which comprises a fourth current sensor for the neutral conductor. It may be the case that the three current sensors lie on two phase conductors and the neutral conductor. In this case, too, the full information content is present, since the neutral conductor current is the sum of the three phase currents and so the unmeasured phase current can be calculated at any time from the two measured phase currents and the current in the neutral conductor.

In a preferred embodiment according to the first and second aspect of the invention, the system also comprises a measuring device and/or communication device, which is supplied by the main energy supply and/or the energy store. In a preferred embodiment, the measuring device and the communication device can be supplied with energy from the energy store in the event of a failure of the main energy supply. In this embodiment, the supply with energy from the energy store permits continuation of the measurement/communication of the electrical parameter even in the event of failure of the main energy supply. The measurement of the electrical parameter can thus be used to ascertain the failure of the main energy supply. The analysis device is thus able to distinguish between a defect of the measuring device and a failure of the main energy supply.

With regard to the first aspect of the invention, the battery and the converter can enable at least a reduced operation of the passenger conveyance installation in the state with a failed main energy supply. In particular, emergency functions, which are required for a more reliable emergency operation of the passenger conveyance installation in the event of failure of the main energy supply, can be taken over provisionally in this embodiment by the energy store and its connection to the conductors of the main energy supply. In contrast with an installation in which the measuring device, the battery and/or the alternating current side of the converter do not lie at the input side of the main switch, but beneath the main switch as viewed in the direction of the energy flow, the assumption of these emergency functions cannot be achieved as easily, since the distinction between opening of the main switch and failure of the main energy supply is not readily possible.

In a preferred embodiment according to the first and/or second aspect of the invention, out of the measuring device, the converter, the energy store and the control device, at least two form a modular unit.

In a particularly preferred embodiment according to the first aspect of the invention, the modular unit comprises the measuring device, the converter, the energy store and the control device.

In a particularly preferred embodiment according to the second aspect of the invention, the modular unit comprises the measuring device and the communication device. In a further embodiment, the modular unit also comprises at least a part of the analysis device.

A modular unit is a physically unified unit of components. In particular, a modular unit is a unified, not readily separable unit comprising the parts belonging to the modular unit, which are arranged together for example by means of a housing in a fixed manner, i.e. not readily detachable. The modular unit can be distinguished from other components, which do not belong to the modular unit, clearly as a unit even in the assembled state. The modular unit is in particular a unit which functions by itself and which can be added to other components. In this sense, a modular unit has a clearly defined interface with clearly defined electrical inputs and outputs for signals and energy. With the aid of these inputs and outputs, the modular unit can thus be easily brought together with other components (main energy supply, main switch, passenger conveyance installation) to form a system according to the first and/or the second aspect.

In an embodiment, the modular unit is provided with a housing and comprises input and output terminals.

According to the first aspect of the invention, the terminals, which form the interface of the modular unit, comprise at least two heavy-duty terminals for the connection of the alternating current side of the converter to the input side of the main switch, and optionally two heavy-duty terminals per sensor of the measuring device. The conductors to be measured can thus be passed into the modular unit (input terminals) and after contact (electrical or electromagnetic) with the sensor back out of the modular unit (output terminals).

The formation of the aforementioned components in the form of a modular unit makes it possible to integrate these components easily into the remaining system. In particular, a modular unit with its own housing and output terminals can also easily be added to the system subsequently after the installation of the remaining system has taken place, i.e. the passenger conveyance installation and the main energy supply. The formation of these components as a modular unit thus enables straightforward retrofitting of the system with the components present in the modular unit. Together with the property that the sensors of the measuring device are fitted at the input side of the main switch, the modular unit can thus also be added subsequently to the other components of the system without access to the passenger conveyance installation.

According to the first aspect of the invention, a system is thus created with the option of relieving the main energy supply of load at least temporarily and partially and thus of reducing or optimizing the energy consumption of the passenger conveyance installation from the main energy supply. For example, the optimization can occur in respect of the excess or lack of energy present in the main energy supply. In the case of a lack of energy in the main energy supply, the passenger conveyance installation can be supplied from the energy store and in the case of an excess of energy the energy store can be charged by the main energy supply. The optimization can also take place on the basis of an energy price, so that the cost incurred by the passenger conveyance installation is minimized. The optimization can in particular also take place depending on a state of the passenger conveyance installation. For example, the energy can be drawn from the energy store during a standby operation of the passenger conveyance installation.

In a particularly preferred embodiment according to the first aspect of the invention, the system also comprises a communication device for the communication of a charging state of the energy store.

In an embodiment according to the first and the second aspect of the invention, the communication device for the communication of the charging state and the communication device for the communication of the electrical parameter are combined in one device. In an embodiment, one and/or both communication devices are part of the control device.

In an embodiment, the communication device is designed for a bidirectional communication. The communication device thus permits not only the transmission of information such as for example the charging state of the energy store and/or the electrical parameter to an analysis device, but also the reception of control commands from the analysis device. Thus, an analysis device, which communicates with a plurality of communication devices from different systems, can according to the first aspect jointly send an instruction for the consumption of energy or the use of energy.

These embodiments make it possible to constitute an analysis device for the analysis of the measured and communicated electrical parameter and/or the charging state of the energy store and the control device independently of a specific system. Thus, for example, an analysis device and the control device can be used for a plurality of systems. By bringing together the information concerning the charging state of the energy stores of the plurality of systems, a global, system-overarching optimization of the energy state of the main energy supply can be carried out and the charging states of a plurality of energy stores can at the same time be controlled. The distribution network, which connects the main energy supplies, can thus be relieved of load, i.e. generation and consumption peaks can be smoothed.

According to the first aspect of the invention, a method for optimizing the operation of a system for the conveyance of passengers in a building also leads to the solution to the problem, wherein the system comprises a passenger conveyance installation constituted as an elevator, an escalator or a moving walkway and in particular a system as described above and in the following. The method comprises the following steps:

identification of a conductor, via which the passenger conveyance installation in the standby operation is supplied with a standby current of a main energy supply of the building, measurement of an electrical parameter at the input side of the main switch, which is connected at the input side to the main energy supply and at the output side, in particular directly, to the passenger conveyance installation, at the identified conductor, detection of a standby operation of the passenger conveyance installation with the aid of the measured electrical parameter and performance of the following steps as soon as the passenger conveyance installation is in the standby operation;

essentially continuous measurement of at least one standby current of the identified conductor, supply from an energy store of the system for the conveyance of passengers of a current essentially corresponding to the measured standby current into the identified conductor of the main energy supply at the input side of the main switch.

Passenger conveyance installations are for the majority of the operating time in a standby operation. Standby operation is an operation in which the passenger conveyance installation stands still or moves with reduced speed. In the standby operation, the passenger conveyance installation awaits for example the next travel instruction. In the case of an elevator installation, a travel instruction is for example a destination call from a floor or in the case of a moving walkway when a passenger steps onto the moving walkway. In the standby operation, in contrast with other operating modes, only a reduced number of electrical consumers of the passenger conveyance installation are active or certain components, for example the drive, are operated with reduced consumption. The traction converter, which supplies the electrical machine, is in a passive state in which no energy flows in the direction of the electrical machine. Other components are inactive. For example, the brake is applied in an elevator installation in the standby operation. In this applied state, the brake consumes no energy. The doors of the elevator installation are closed in the standby operation and remain in this state during the standby operation, in which they consume no energy. Some auxiliary consumers, such as for example the car lighting of an elevator installation, are also switched off in the standby operation. In the standby operation of an escalator installation, the latter stands completely still or travels with a reduced speed. For example, the escalator installation in the standby operation is also illuminated with reduced intensity or the lighting is completely switched off. The lengths of the standby operation of the passenger conveyance installation can differ depending on the area of use (apartment building, office building, shopping center or hospital). The passenger conveyance installation is for the most part in the standby operation, so that the standby operation can for example account for more than 50% or more than 70% of the total operating time. Although a reduced number of electrical consumers are active in the standby operation, the standby operation thus contributes a not inconsiderable proportion to the energy consumption of the overall operation. The standby operation thus has a substantial influence on the operating costs of the passenger conveyance installation.

In the case of passenger conveyance installations, the consumers which are active in the standby operation are often connected to a single conductor of the main energy supply. There is therefore a standby conductor in the system. The electrical parameter of the standby conductor has to be measured to detect the standby operation. The method therefore includes the step of identifying the standby conductor. In this step, it is ensured that the standby conductor comprises a sensor. For this purpose, the method can provide for the testing of all the conductors of the energy supply in order then to provide the identified standby conductor with a sensor. A device integrated into the system can be used for this purpose, which permits all the conductors to be successively connected to a sensor. Such a device can for example be a switch with a plurality of contacts. In the presence of a single switch, each of the, for example, four conductors can thus be connected to an input side of the switch. The switch enables the selective switching of one of the inputs through to the output, wherein the sensor is connected electrically and/or electromechanically to the output. A further possibility consists in providing a sensor for each conductor, so that the standby conductor specifically comprises a sensor and the need for identification is not required. A further, but less preferred possibility for the identification of the standby conductor consists in the standby conductor being identified by the installing engineer with the aid of a diagram during the installation of the measuring device, so that the latter can then fit the sensor to the identified conductor. This option has the drawback that information (for example a diagram) of the passenger conveyance installation has to be known. Furthermore, it is susceptible to errors, because even with an existing diagram, the actual cabling may diverge from the specified cabling which is represented in the drawing. In the case where the consumers active in the standby operation are distributed over a plurality of conductors, it is advantageous for a sensor to be fitted to each of these conductors.

According to the first aspect of the invention, the detection of the standby conductor by step-by-step measurement at each conductor also enables the fitting of the monophase converter to the standby conductor. Despite the use of a monophase converter with a three-phase system, it can thus be ensured that energy can be fed into the standby conductor.

This enables the use of a cost-effective monophase converter with a three-phase main energy supply.

In the feed-in step, a current corresponding to the measured standby current is fed in. Accordingly, there is a current which in the phase position corresponds to the standby current. The amplitude does not necessarily have to correspond to the standby current amplitude and can vary depending on the charging state of the energy store. If the fed-in current does not correspond in its amplitude to the measured standby current amplitude, a hybrid supply to the standby operation results, i.e. one part of the required energy originates from the main energy supply and another part from the energy store.

By means of the method, the main energy supply can be relieved of load in the standby operation by energy from the energy store. Such a method thus makes it possible to selectively eliminate or at least reduce the energy consumption of the system in the standby operation, without the operation of the system being influenced. This enables the optimization of the energy consumption of the system and thus for example a reduction in operating costs. The standby operation of the passenger conveyance installation can be covered by energy from the main energy supply especially in times of low electricity prices and by the energy from the energy store at times of high electricity prices. This enables a reduction in the energy costs of the system and therefore a reduction in the operating costs of the passenger conveyance installation. The larger the energy store, the more the operation can be optimized. The greater the fluctuations in the electricity price, the greater the possibility for potential savings by using the method. In a preferred embodiment, the method also includes the step of charging the energy store with energy. For this purpose, the energy is drawn from the main energy supply at the input side of the main switch.

The energy store can thus be charged directly from the main energy supply. This makes it possible for the energy store to draw energy from the main energy supply during times of low energy prices, which can then be fed into the standby conductor to relieve the load on the main energy supply when there are higher energy prices. The energy store thus charges up for example in the night and feeds back its energy at high consumption times, for example at midday. The energy store thus enables a saving on operating costs and therefore a more cost-effective operation of the passenger conveyance installation.

In a preferred embodiment, the method also includes reception of control information. The method controls the charging-up of and/or the supply from the energy store on the basis of the control information.

The control information can be sent for example from an overriding control device. The charging of the energy store with energy from the main energy supply or the supply of energy from the energy store into the main energy supply can be controlled by the control information. This permits the control of the charging-up or supply from a unit set apart from the system. In particular, this makes it possible to control in a coordinated manner a plurality of the systems described above and in the following. As a result of the coordination of a plurality of systems, the main energy supply, to which this plurality of systems are connected, can be relieved of load many times more than would be possible with the control of a single system. By means of the charging of the energy stores of the systems, an energy excess of the energy network, to which the main energy supplies of the systems are connected, can be balanced out. The energy network can be supported by the simultaneous supply of active and/or reactive power from the energy stores of a plurality of systems. Whereas the relief from load and support for the energy network is of course achieved in the case of only one system, the effect is greater in the case of the control from a plurality of systems coordinated by means of the control information. The stability of the energy network can thus be significantly improved by the coordinated control from a plurality of systems.

The overriding control device is a control device which controls a plurality of systems as described above and in the following. The use of control information from an overriding unit also makes it possible for the systems not to mutually influence one another and thus the supplying of a first system leading to the charging of a second system, as a result of which an oscillation between the two systems could arise. By means of the control information, the charging and discharging of the energy store can also be controlled on the basis of information which is not accessible to the system itself and also cannot be detected in the system by the system itself.

In a preferred embodiment, the method also includes the monitoring of a state of the energy store. The method further includes the communication of the charging state of the energy store to an analysis device overriding the system and set apart from the remaining system.

The communication of the charging state of the energy store to the overriding control device makes it possible to regulate the charging and the discharging of the energy store.

If the overriding control device is used to control a plurality of the systems described above and in the following, it thus enables the charging state of the energy stores of the individual systems to be received. The energy stores in the various systems represent when combined a kind of large store, the charging state of which is known and can thus be regulated. If the control device also contains information concerning the state of the remaining energy system, such as for example electricity prices, load flows in different network nodes and the position of the systems in relation to the network nodes, frequency of the network and so forth, the control device can charge up the energy store or support the standby operation of the passenger conveyance installation in such a way that the operating cost of the installations is reduced and/or the energy network stabilized.

In a preferred embodiment of the method, in the step of feeding-in energy, the feed-in power essentially corresponds to the standby power of the passenger conveyance installation.

The main energy supply is completely relieved of load by the supply of the standby power to the passenger conveyance installation. During the supply, the passenger conveyance installation is supplied solely by the energy from the energy store. The operation of the passenger conveyance installation in the standby operation is thus carried out essentially under the conditions, i.e. at the price, which prevailed in the main energy supply at the time of the charging of the energy store. The main energy supply is also completely relieved of load at the point at the input side of the main switch. The main energy supply does not take advantage of the standby operation of the passenger conveyance installation at this point.

A method for evaluating a state of a passenger conveyance installation, constituted as an elevator, escalator or moving walkway in a building, of a system, in particular of a system as described above and in the following, also leads to the solution of the problem according to the second aspect of the invention. The method comprises the following steps:

electrical or electromagnetic connection of a measuring device for measuring an electrical parameter at the input side of a main switch, which is connected at the input side to a main energy supply of the building and at the output side, in particular directly, to the passenger conveyance installation.

measurement of a temporal profile of the electrical parameter of the main energy supply of the building.

transmission of the temporal profile of the electrical parameter by means of a communication unit to an analysis device.

evaluation of the temporal profile of the electrical parameter with respect to the state of the passenger conveyance installation.

The step in the method involving the connection includes the fitting of the sensor to the conductors, which connect the main energy supply to the main switch. The connection can take place electrically, i.e. with an interruption of the conductor for the electrically serial integration of the sensor between the main energy supply and the main switch, and/or electromechanically, i.e. contactless without interruption of the conductor, for example by means of a Hall-effect current sensor. The connection preferably leads to a fixed, not readily detachable connection of the sensor to the corresponding conductor.

The method thus permits the measurement of the electrical parameter of the passenger conveyance installation, without the fitting of sensors to the passenger conveyance installation being required for this. This measurement according to the second aspect of the invention does not differ from the measurement of the standby current in the method according to the first aspect. Apart from the current, other electrical parameters can also be measured in the second aspect. According to the second aspect, however, the measurement is not carried out to determine a current to be fed in. The measurement results are measured according to the second aspect for the assessment of the state of the passenger conveyance installation.

In a particularly preferred embodiment according to the second aspect of the invention, the steps for the evaluation also include the steps:

subdivision of the profile into different partial profiles, in particular partial profiles for different movements of the passenger conveyance installation, comparison of the partial profile with a target partial profile.

The essentially continuous measurement of the temporal profile of the electrical parameter is subdivided into partial profiles for the analysis (comparison with target profiles). The partial profiles can comprise sections of the temporal profile of differing length. A partial profile can begin and end with the occurrence of a specific event (exceeding of an amplitude, repeated occurrence of a profile, specific pulse length, specific gradient of the profile, number of peaks in a specific time, distance between two peaks or a combination of the aforementioned events). The subdivision into partial profiles can thus be carried out in particular in a retroperspective, for example as with a time delay of several period durations. The period duration of the main energy supply can amount for example to 20 ms. In this case, the subdivision of the temporal profile into partial profiles can be brought about for example with a delay of 50 period durations, i.e. one second. Since the partial profiles are used for the analysis of the elevator state, an immediate subdivision and an immediate comparison (analysis) is not required. A delay, even of several seconds, is possible without incurring problems. For example, the temporal profile can be a current profile. In the case of an elevator installation, an essentially rectangular current profile with an amplitude greater than 8 amps and a pulse length of less than 5 seconds can be assigned unequivocally to a travel movement. The detection of travel movements can also be assisted with the aid of peaks with, by comparison, short pulse lengths at the start and at the end of the travel movement. The peaks are caused by door opening and door closing movements, which take place before and after each trip. The actual amplitude of a current profile belonging to a travel movement is dependent on the loading of the elevator installation. The 8 amp threshold for the detection of a travel movement results from a travel movement which requires a minimum drive force and the variation from installation to installation. The actual pulse width of the rectangular profile results from the number of floors over which a specific trip passes. The 5 second threshold corresponds to the time which the elevator installation requires for the trip from one floor to the next floor. Since the other consumers of the elevator installation all have smaller amplitudes and/or different profile lengths, the current profile with an essentially rectangular shape, amplitudes greater than 8 amps and a pulse width greater than 5 seconds and other characteristics after the completion (after falling below the 8 amp threshold), i.e. the travel movement partial profile, can thus be extracted unequivocally from the temporal profile. Depending on the average amplitude, the pulse width and other properties of the extracted profile, the latter can be assigned to a specific travel movement (actual load, trip length) and then compared with a target profile. In this comparison, it can be ascertained for example whether the trip was completed in the time corresponding to the target profile. If the trip lasts longer, it can thus be concluded for example that there is increased friction in the drive and therefore required maintenance.

In a preferred embodiment of the method according to the second aspect of the invention, a measured profile is used for the iterative refinement of a corresponding target partial profile.

The method described above and in the following is based on a temporal profile of an electrical parameter at the input side of the main switch of the main energy supply. The method can thus be used for passenger conveyance installations about which no information is known. Whereas at the start of the method it may possibly be unclear how a target profile of a specific movement of the passenger conveyance installation should appear, the type of installation and the age of the installation, for example, can be determined with a plurality of recorded movements on the basis of comparisons. With the knowledge concerning the present installation, the target profiles with which the measured profiles are compared can also be determined more precisely. An indication of possibilities and an indication of the reliability of the method thus increases with the measured and stored data available for the analysis.

In a further embodiment, this step in the method can be speeded up by manual inputs. When the measuring device is fitted, for example, the publicly accessible information concerning the passenger conveyance installation can be made available manually by the assembly engineer of the measuring device and the analysis device. The brand, the loading capacity, the number of floors, the type of drive, the year of installation can be inputted manually and the assignment of suitable target profiles can thus be speeded up.

In a preferred embodiment of the method according to the second aspect of the invention, the target profile is essentially an average profile of a first measured profile of a first passenger conveyance installation and a second measured profile of a second passenger conveyance installation.

The method described above and in the following has the purpose of evaluating the passenger conveyance installation with regard to its state, i.e. in particular with regard to its wear/ageing, in order to detect amongst other things defects of the passenger conveyance installation and to eliminate the latter by suitable servicing. In order to determine a target profile which enables such information, it is advantageous to derive the target profile from the greatest possible number of different passenger conveyance installations of the same type. In particular, it is advantageous if, apart from the corresponding profiles, the year of installation of the installation is also known by for example a manual input. From the year of installation and a recorded average trip behavior (for example number of trips per day and the average length of the trip), an already completed number of trips can be calculated without access to the installation being required for this. If the target profiles for this type of installation based on as large a number of different installations as possible is then determined in as many different life phases of the installation as possible, this leads to target profiles which determine precise information concerning the state of the installation.

In a preferred embodiment of the method according to the first aspect and/or the second aspect of the invention, the measurement of the electrical parameter preferably takes place continuously, particularly preferably continuously. In particular, the measurement takes place around ten times, preferably around a hundred times, particularly preferably around a thousand times per period duration of the network voltage.

The more detailed the resolution of the method, the more precisely amplitude changes of the electrical parameter can be measured and evaluated, as a result of which information is also possible with respect to auxiliary operations, which in comparison for example with the drive bring about only small changes of the electrical parameter.

In a preferred embodiment of the method according to the second aspect of the invention, the step of evaluation comprises the determination of one or more of the properties selected from the following group, comprising:
- nature of passenger conveyance installation, in particular in the case of elevator installations whether it is a hydraulic elevator installation or a traction elevator installation.
- type of passenger conveyance installation, in particular the approximate rated load of the installation.
- number of service movements of the passenger conveyance installation per unit of time.
- standby current of the passenger conveyance installation.
- usage category of the passenger conveyance installation.
- energy class of the passenger conveyance installation.
- in the case of elevator installations, the number of storeys of the installation.
- in the case of hydraulic elevator installations, whether it is an upward or downward movement.
- state of the auxiliary operation, for example a door drive.
- in the case of escalators, the transport weight per unit of time.

The electrical parameter is for example an electric current. A current profile of a hydraulic elevator installation differs in the current profile from a traction elevator installation, since a hydraulic installation does not require drive energy during a downward movement. Other consumers associated with the travel of the elevator installation, for example the door drives, which are active before and after a trip, can be detected in the current profile of both types of elevator. A regularly recurring current profile, which contains door opening/door closing partial profiles, without any drive partial profile following in between, permits the conclusion that it is a hydraulic elevator. If the elevator installation is recognized as a hydraulic installation, a distinction can be made in the further current profiles between downward and upward movements.

Information concerning the installation parameters can also be acquired with the aid of the current profile. Thus, for example, the variation in the occurring amplitudes of the drive current is an indication of the rated load of the installation. In particular, a minimum value and/or a maximum value can be an indication of the type of installation.

It happens during the service that the elevator installation is moved manually with a reduced travel speed. The drive current profile of such a service movement differs from the current profiles in the normal operation. In a service movement, the opening and closing of the doors may not happen, which is expressed in a lack of pulses in the electrical parameter before and after the trip. They differ in particular by the amplitude of the drive current, the absence of the door movement current profiles before and after the drive current profiles and by short drive current profiles with pulse lengths which do not correspond to a trip from floor to floor. The method thus permits the identification of a service movement and therefore also the determination of the service activity (date of the last maintenance) on the installation.

The continuous measurement of the current profile and in particular of the current profile at the conductor, at which a plurality of standby components are connected, permits the method to distinguish between a normal operation and a standby operation. The method thus enables the determination of the frequency of the standby operation in a certain period of time. In combination with the previously mentioned recognition of the service operation, the method can retrospectively determine what percentage of the time the installation was in one of the three operating modes. It is also possible to continuously make a prediction as to the trips to be expected in a period of time. This prediction can be very accurate through the continuous measurement and adaptation of the prediction. This information delivers indications for the planning of the service interventions.

In the standby operation, the power components, i.e. the drive (electrical machine), the brakes and the door drives are not active.

In the case of elevator installations, the control device and its periphery, the ventilation of the car or cooling of the components, the car light and other lighting in particular are active in the standby operation. The drive (converter) is also a consumer in the standby operation of the passenger conveyance installation, since the latter itself runs in a standby operation. The door drive is also in a standby operation for some time after the closure of the door, so that the latter also contributes to the standby consumption of the elevator installation.

In the normal operation, the main consumers are the electrical drive, the ventilation of the car, the brakes and other ventilators for cooling components of the installation.

Distinguishing the standby operation from the normal operation and service operation enables the determination of the so-called usage category of the passenger conveyance installation, in particular of the elevator installation. The usage category is defined for example according to VDI 4707-1 standard, issue March 2009 or VDI 4707-2, issue October 2013, according to which definition a distinction is made between five different usage categories on the basis of the daily travel hours. A further, somewhat different definition is found in ISO 25 745-2 standard, issue April 2015 or the corrigendum to this standard in the November 2015 issue, which defines six different usage categories on the basis a number of trips per day. The method thus enables the determination of the usage category of a passenger conveyance installation without access to the installation itself having to be present. If the usage category is known, the energy class of the passenger conveyance installation can be calculated on the basis of the energy consumption. The method thus permits, apart from the determination of the usage category, also the determination of the energy class of the installation, and this without access to the installation itself.

The drive partial profile (increase in the current amplitude to a high amplitude compared to the other operation, constant high amplitude for a certain time) contains with the partial profile length (i.e. the time in which the high drive amplitude is present, the pulse length) information concerning the length of the trip. If the partial profile lengths of the trips are analyzed over a specific period, the travel time for a trip from one floor to the next floor can be determined on the basis of the shortest trips. If the longest time is divided by this calculated 1-floor travel time, a conclusion can be drawn as to the number of floors of the elevator installation that are present.

The door opening/door closing partial profiles and in particular the time required for the latter, i.e. the pulse length of such a partial profile, permit a conclusion to be drawn as to the type of door and the state of the door drive. In the case of a jammed door drive no longer properly set, the time which is required for the door opening (partial profile pulse length) may thus be doubled for example. Other auxiliary drive partial profiles also permit information to be acquired concerning the state and functioning of the corresponding auxiliary operation. Thus, for example, an increased amplitude of the car ventilation partial profile is an indication of soiling/blockage of the car ventilation and/or of damage in the ventilator bearing.

A broken coil of the brake can also be recognized. In elevator installations, the coil is often designed redundant for supplying the brake with current. If one of these coils is broken, the current, which is provided for releasing the brake onto this coil, changes.

If the passenger conveyance installation is an escalator or a moving walkway, information concerning the transport weight can be acquired on the basis of the amplitude of the partial profile. With data from a sufficiently long operating period, an approximate indication as to the number of passengers transported can also be acquired.

In a preferred embodiment of the method according to the first and/or second aspect of the invention, the sensor of the measuring device is connected to a first conductor. The sensor measures the electrical parameter for a specific time. The sensor is then connected to at least one further conductor of the energy supply. The measuring device then evaluates the measurement results for the information content. The method then includes the connection of the sensor to the conductor, the measurement whereof has the highest information content.

By means of this additional step in the method, the number of sensors can be reduced. The steps permit the identification of the conductors at which the sensors must be positioned, in order to enable the evaluations described above and in the following. With this additional step in the method, it can be ensured that, even with the presence of only one sensor, the maximum information content, for example the standby operation, is detected, i.e. for example the sensor is positioned on the standby conductor. Despite low measuring device costs, it is thus ensured that the essential information for performing the evaluation is detected.

According to a first aspect of the invention, the use of an energy store, installed at the input side of a main switch which is arranged in a building, and which main switch is connected at the input side to a main energy supply of the building and at the output side, in particular directly, to a passenger conveyance installation of the building, for reducing the energy consumption of the passenger conveyance installation during a standby operation, leads to the solution to the problem.

Through the use of an energy store connected at the input side of the main switch to the main energy supply, it is made possible for a passenger conveyance installation to be able to be upgraded with regard to the network compatibility and the operational efficiency (for example operating costs) independently of the manufacturer of the installation and independently of the type of installation and without access to the actual passenger conveyance installation. Furthermore, the availability of the installation, in particular the standby operation, is increased by the use of the energy store, since the installation has, in addition to the energy store that may already be present in the installation, an increased energy storage capacity through the use of an energy store at the input side of the main switch. It proves to be advantageous that the energy store, which is connected at the input side of the main switch to the main energy supply, is not present exclusively for the emergency operation, but also generates an added value for the operator of the installation in the normal operation. The comparatively expensive and also space-consuming energy store is thus made greater use of compared to a pure emergency store.

According to the second aspect of the invention, the use of an electrical parameter for the evaluation of a state of a passenger conveyance installation of a building constituted as an elevator, an escalator or a moving walkway also leads to the solution to the problem. The electrical parameter is detected at the main energy supply side of the main switch which is arranged in the building, and which main switch is connected at the main energy supply side to a main energy supply of the building and at the output side, in particular directly, to the passenger conveyance installation.

Through the use of a measuring device connected at the input side of the main switch to the main energy supply, it is made possible for a passenger conveyance installation to be analyzed and monitored for its state independently of the manufacturer of the installation and independently of the type of installation and without access to the actual passenger conveyance installation.

The first aspect and the second aspect of the invention both require a measuring device for measuring the electrical parameter. The invention of the first aspect also requires an energy store and at least one converter, with which energy of the main energy supply can be stored in the energy store or energy can be fed from the energy store at the input side of the main switch into the conductors of the main energy supply. All the previously described features and embodiments with regard to the second aspect of the invention can also be used in a system or method according to the first aspect of the invention. The presence of the measuring device for measuring the electrical parameter and the presence of an analysis device enables the partial or complete implementation of the second aspect of the invention. A system and a method are thus created, which enable the advantages of the first and the second aspect of the invention in a cost-effective manner (with few sensors).

A method for optimizing the energy consumption and/or evaluating a state of a system for the conveyance of passengers according to the first and second aspect of the invention comprises at least the steps:
- identification of a conductor, via which the passenger conveyance installation is supplied in a standby operation with a standby current of the main energy supply,
- measurement of an electrical parameter at the input side of the main switch on the identified conductor,
- transmission of the temporal profile of the electrical parameter by means of a communication unit to an analysis device,
- evaluation of the temporal profile of the electrical parameter with regard to the state of the passenger conveyance installation,
- detection of a standby operation of the passenger conveyance installation with the aid of the measured electrical parameter and performance of the following steps, as soon as the passenger conveyance installation is in the standby operation,
- essentially continuous measurement of at least one standby current of the identified conductor,
- feeding from the energy store of a current corresponding to the measured standby current into the identified conductor of the main energy supply at the input side of the main switch.

A system which comprises a measuring device at the input side of the main switch and combines the previously described embodiments of the system according to the first and second aspect thus leads to the solution to the problem. These systems are particularly preferred embodiments of a system according to the invention.

A method which measures an electrical parameter at the input side of the main switch and combines the preceding embodiments of the method according to the first and second aspect thus leads to the solution to the problem. These methods are particularly preferred embodiments of a system according to the invention.

DESCRIPTION OF THE DRAWINGS

The invention is explained further in the following with the aid of examples of embodiment in figures. In the figures.

DETAILED DESCRIPTION

Figure 1:
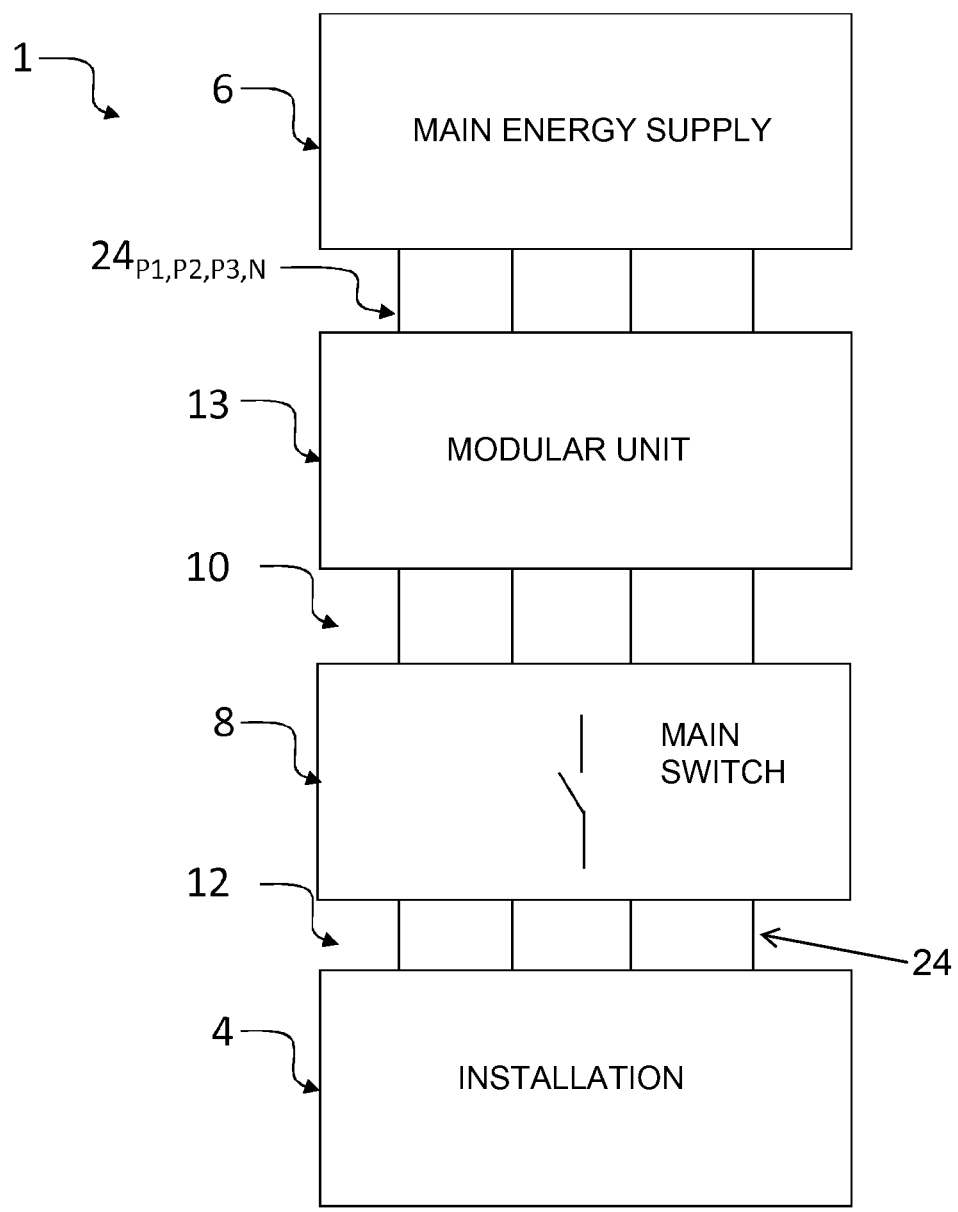
FIG. 1: shows a diagrammatic representation of a first embodiment of a system for the conveyance of passengers.

FIG. 1 shows a system 1 for the conveyance of passengers according to the first and the second aspect of the invention. System 1 comprises a main energy supply 6. Main energy supply 6 is connected by three phase conductors $24_{P1, P2, P3}$ and a neutral conductor $24_N$ to input side 10 of a main switch 8. System 1 comprises a modular unit 13 electrically connected to the phase conductors and the neutral conductor. Modular unit 13 is electrically connected at input side 10 of main switch 8 to the phase conductors and the neutral conductor. It is therefore arranged electrically in series between main energy supply 6 and main switch 8. Main switch 8 has an output side 12, from which the four conductors 24 are also connected to a passenger conveyance installation 4. Henceforth and in the further figures, the phase conductors and the neutral conductor are denoted jointly with common reference number 24.

Figure 2:
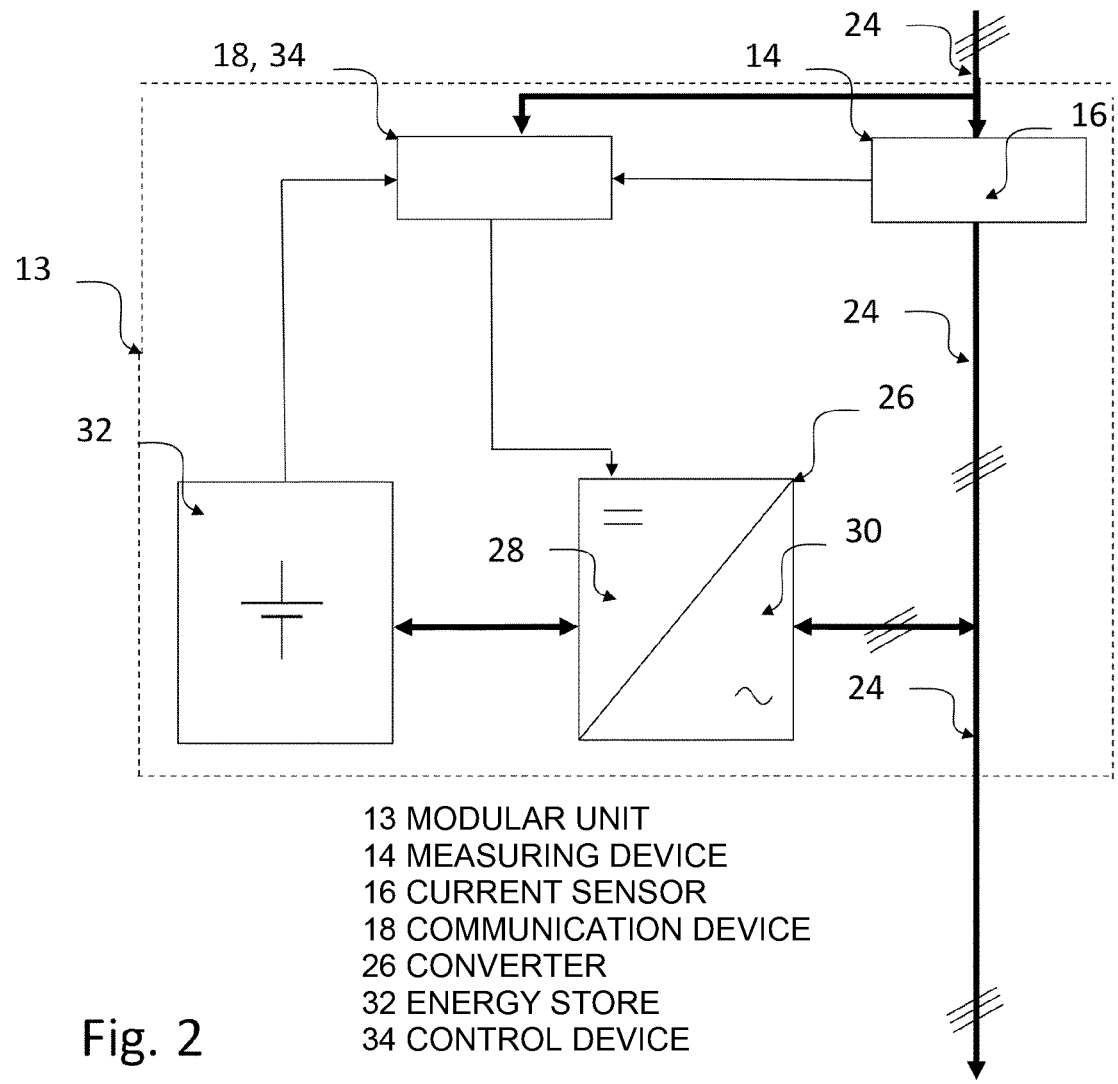
FIG. 2: shows a diagrammatic representation of a first embodiment of a modular unit of the system from FIG. 1, FIG. 3: shows a diagrammatic representation of a second embodiment of the modular unit of the system from FIG. 1, FIG. 4: shows a diagrammatic representation of a third embodiment of the modular unit of the system from FIG. 1, FIG. 5: shows a diagrammatic representation of a second embodiment of the system for the conveyance of passengers.

FIG. 2 shows a first embodiment of modular unit 13. Modular unit 13 comprises a measuring device 14, a converter 26, an energy store 32 and a communication and control device 18, 34. Converter 26 has an alternating current side 30 and a direct current side 28, wherein alternating current side 30 is electrically connected to conductors 24 and direct current side 28 is electrically connected to energy store 32. Measuring device 14 comprises a current sensor 16. Conductors 24 are led into measuring device 14 for the connection to current sensor 16 in modular unit 13, where conductors 24 are electrically connected to current sensor 16. Conductors 24 then lead out of measuring device 14 back into the modular unit. From the output of measuring device 14, conductors 24 are electrically connected to the output of modular unit 13. Alternating current side 30 of converter 26 is electrically connected to conductors 24 led out from measuring device 14. Direct current side 28 is electrically connected to energy store 32. Modular unit 13 is constituted according to a first aspect of the invention and according to the second aspect of the invention and thus enables an influence on the energy consumption from main energy supply 6 (not shown, see FIG. 1) and an analysis of the current in respect of the state of passenger conveyance installation 4 (not shown, see FIG. 1), wherein both these aspects are dependent on the electrical parameter, which is measured by current sensor 16 at the input side of main switch 8 (not shown, see FIG. 1). According to a first aspect of the invention, modular unit 13 thus enables on the one hand an energy flow to passenger conveyance installation 4 passing from main energy supply 6 (not shown, see FIG. 1) through modular unit 13, said energy flow only being measured but not influenced by modular unit 13. On the other hand, modular unit 13 enables an energy flow from main energy supply 6 to converter 26, where the alternating current of main energy supply 6 is converted into a direct current for charging energy supply 32. In this first embodiment, converter 26 enables a bidirectional energy flow, so that the energy can be fed back from energy store 32 via the same converter 26 into the conductors 24. According to the first aspect of the invention, the possibility thus arises of an indirect energy flow, which passes from main energy supply 6 via the energy store to passenger conveyance installation 4.

In a first step, energy flows from main energy supply 6 via converter 26 into energy store 32. In a second step, energy flows from energy store 32 via converter 26 into conductor 24 and thus out of modular unit 13 to passenger conveyance installation 4. The division of the energy flow into a charging energy flow and a discharging energy flow is thus enabled by energy store 32. This makes it possible to draw energy from the main energy supply (charging energy flow) if the main energy supply has for example an energy excess (low energy prices). Furthermore, it makes it possible for the standby operation of passenger conveyance installation 4 to be supplied from the energy store for example in times of a lack of energy in the main energy supply (high energy prices). According to the first aspect of the invention, control device 34 controls the energy flow in modular unit 13, in particular in converter 26. Control device 34 receives from measuring device 14 the current values measured in conductors 24 by sensor 16. Control device 34 also contains information from energy store 32 concerning the charge state of energy store 32. In this embodiment, control device 34 also receives through communication device 18 information concerning the state of main energy supply 6, in particular an energy price and/or for example a control command of a control device overriding system 1 (not shown). Based on this information, control device 34 decides whether it should block converter 26 and thus bring about a direct energy flow from main energy supply 6 to passenger conveyance installation 4 or an energy flow from main energy supply 6 into energy store 32 (rectifier operation of converter 26) or an energy flow from energy store 32 into conductor 24 (inverter operation of converter 26). In this embodiment of modular unit 13, the communication and control device is supplied with electrical energy from phase conductor 24 of main energy supply 6 or a current supply integrated into the control. This offers the advantage that communication and control device 18, 34 is also supplied with energy with an opened main switch and can thus perform its task even then. Communication device 18 for example can thus communicate with the overriding control device even in the case of an open main switch 8. For the implementation of the second aspect of the invention, the control device also contains an analysis device. According to the second aspect of the invention, the measured current profiles with respect to the type and the state of passenger conveyance installation 4 are thus analyzed via control device 34 and the analysis device, for which purpose the measured current profile is subdivided into partial current profiles and compared with stored partial current profiles.

Figure 3:
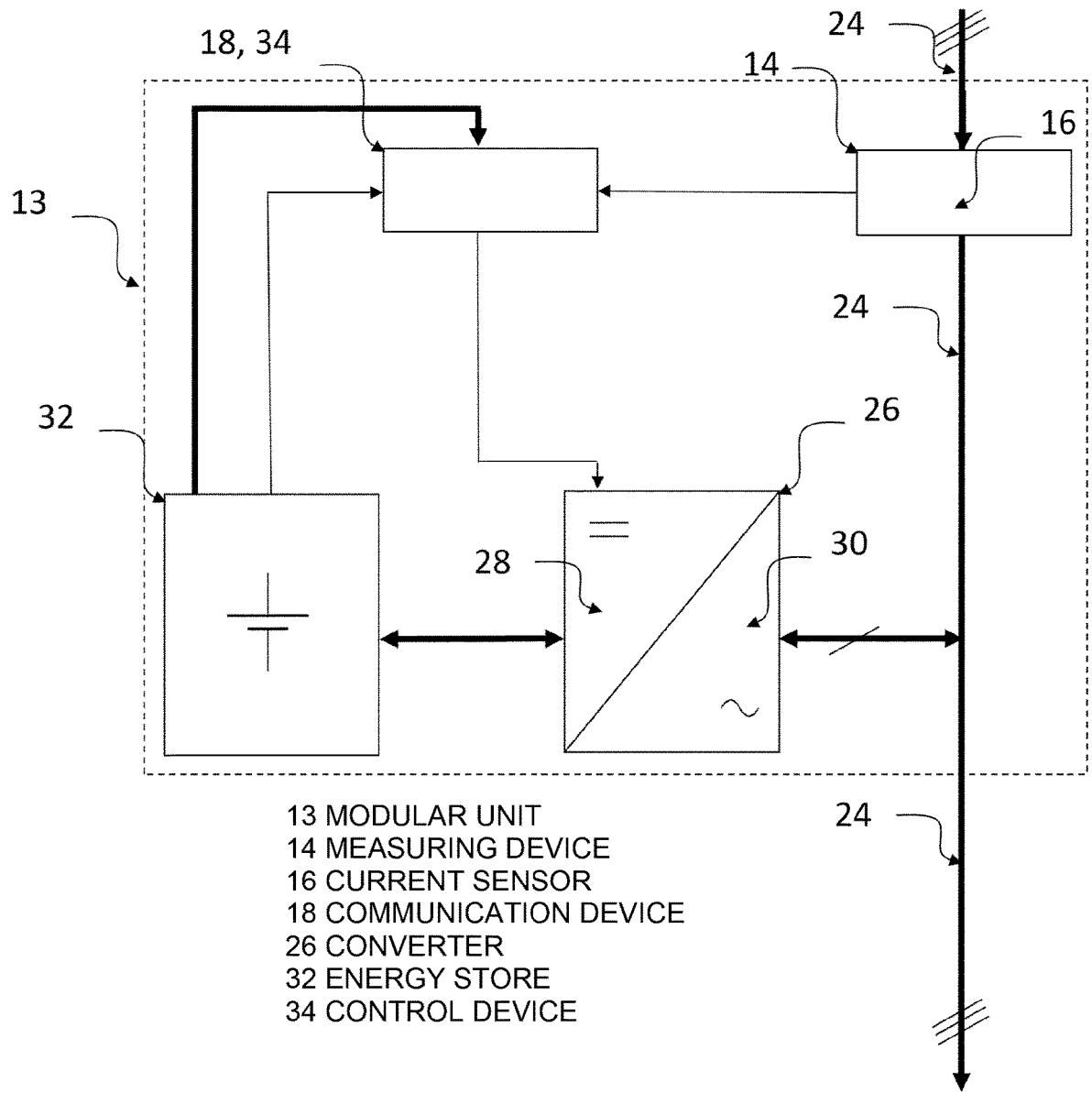

FIG. 3 shows a further embodiment of modular unit 13 according to the first and the second aspect of the invention. The elements already present in FIG. 2 are denoted with the same reference numbers in FIG. 3 and the following figures, wherein a renewed description of the elements is dispensed with and instead reference is made to the description in the above section.

In contrast with the embodiment of FIG. 2, this further embodiment of modular unit 13 is provided with a single-phase converter 26. The components of passenger conveyance installation 4 active in the standby operation are all connected in this embodiment to a phase conductor 24 of the main energy supply. This phase conductor 24 is connected via converter 26 to energy store 32. Furthermore, energy store 32 is used for supplying communication and control device 18, 34. This has the advantage that communication device 18 can thus communicate with the device (not shown) overriding system 1 even in the event of failure of main energy supply 6.

Figure 4:
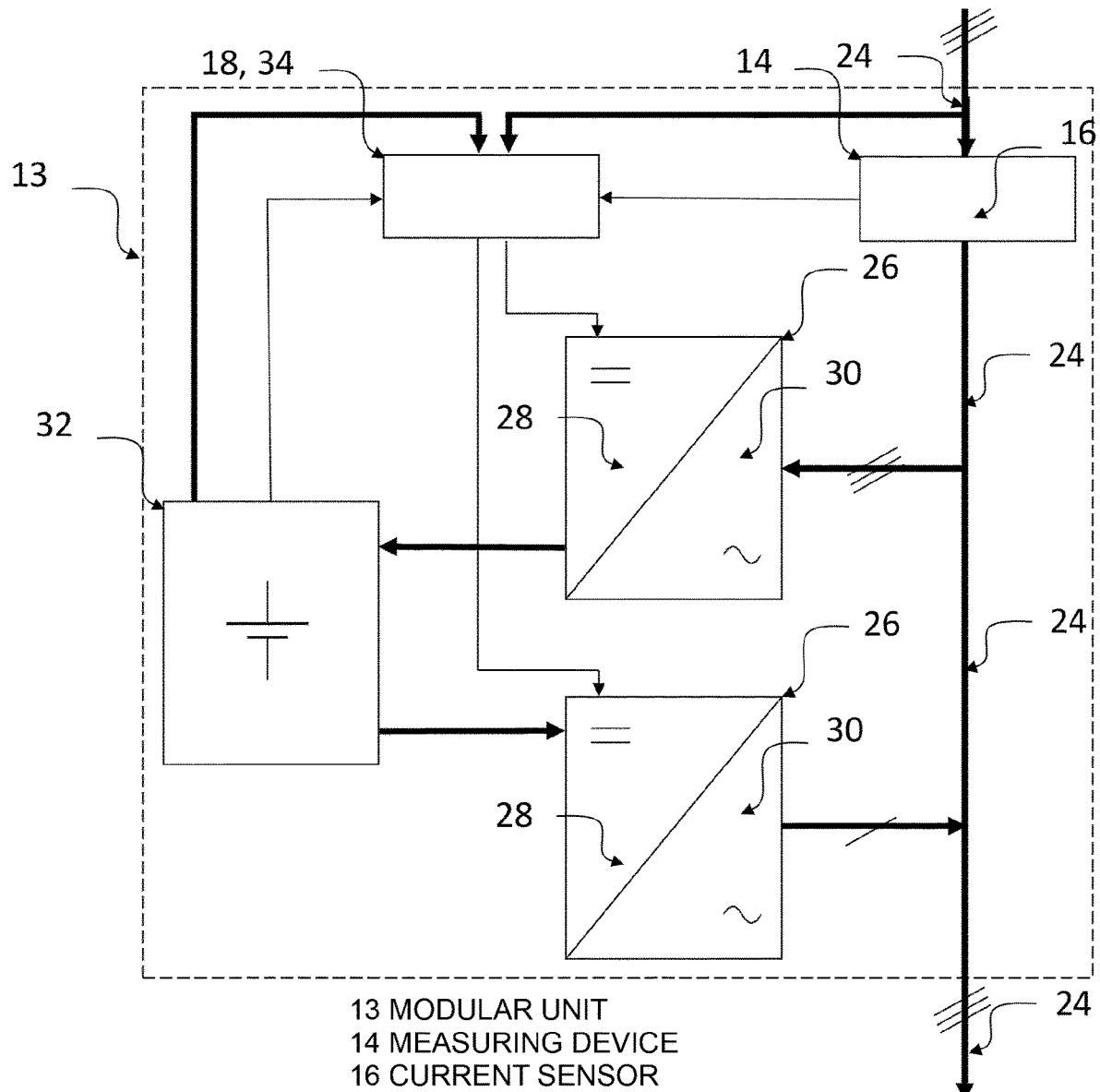

FIG. 4 shows a further, third embodiment of modular unit 13 according to the first and the second aspect of the invention. In contrast with the first and second embodiment of modular unit 13, in the third embodiment of modular unit 13 converter 26 is divided into two unidirectional converters 26. This embodiment thus comprises a first unidirectional three-phase converter 26 for charging the energy store with energy of main energy supply 6. Furthermore, this embodiment comprises a second unidirectional converter 26, which is constituted single-phase and enables the conversion of the energy of energy store 32 into energy for feeding into phase conductor 24. In this third embodiment, communication and control device 18, 34 is supplied both from main energy supply 6 and also from energy store 32.

Figure 5:
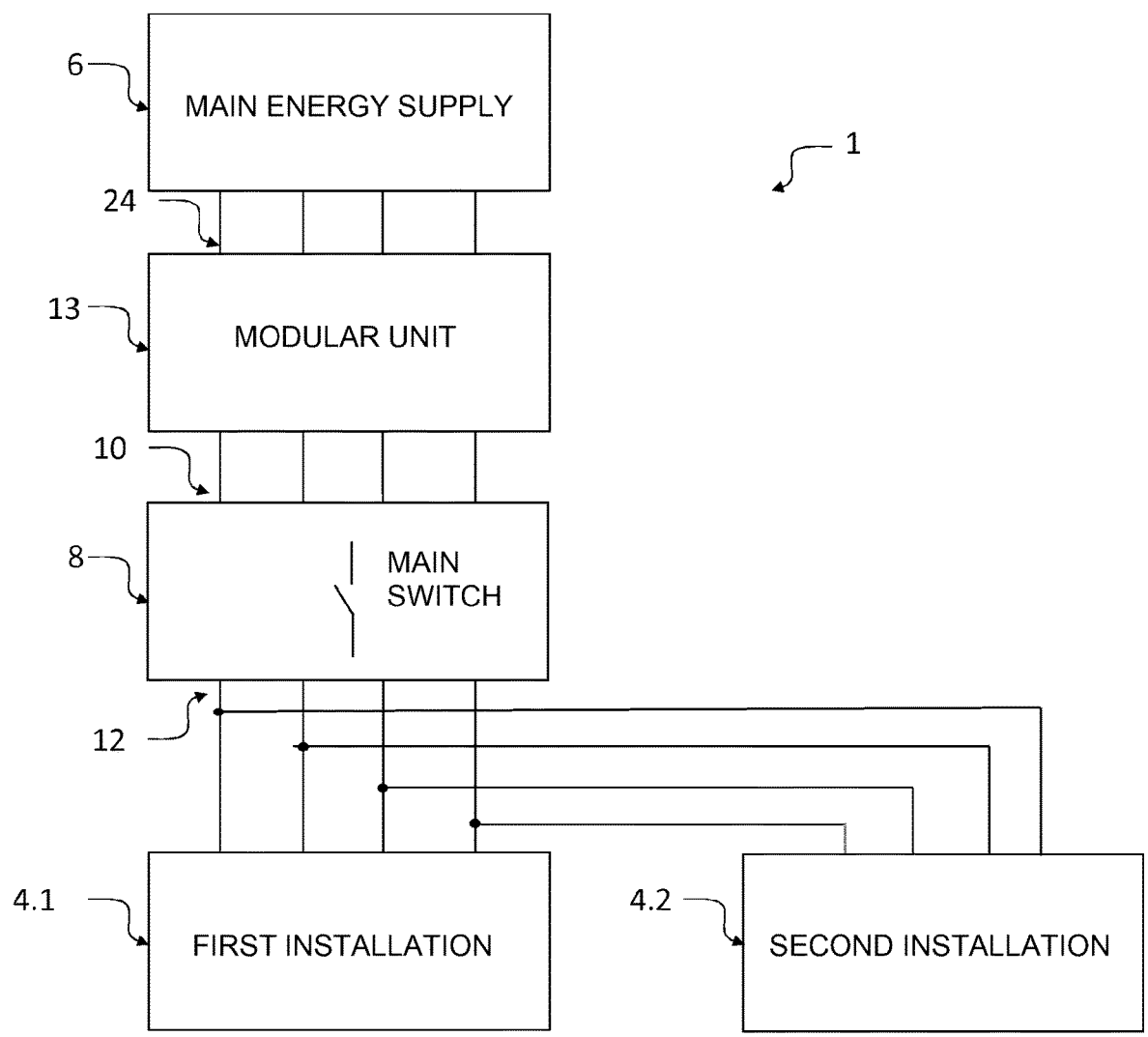

FIG. 5 shows a second embodiment of system 1 according to the first and second aspect of the invention. In contrast with the first embodiment, system 1 comprises a first passenger conveyance installation 4.1 and a second passenger conveyance installation 4.2, which are both electrically connected in parallel to output side 12 of main switch 8. In this embodiment of system 1, modular unit 13 is provided both for first passenger conveyance installation 4.1 and also for second passenger conveyance installation 4.2. Accordingly, measuring device 14 of modular unit 13 measures the sum of the electric current of first passenger conveyance installation 4.1 and second passenger conveyance installation 4.2.

Figure 6:
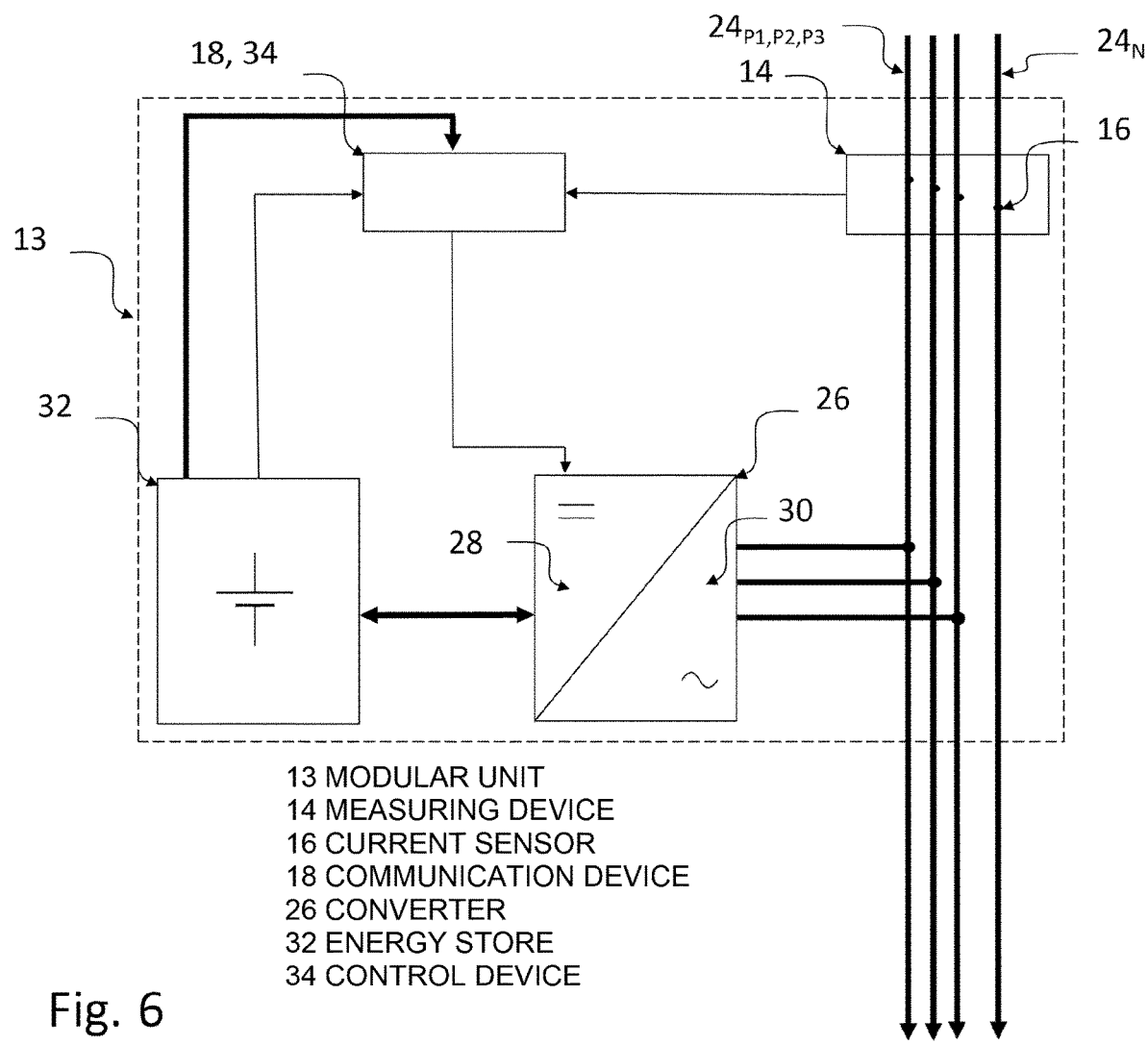
FIG. 6: shows a detailed representation of the second embodiment of the modular unit from FIG. 3, FIG. 7: shows a diagrammatic representation of a third embodiment of the system for the conveyance of passengers.

FIG. 6 shows a detailed representation of measuring device 14 of modular unit 13 of the embodiment in FIG. 3. It can be seen that measuring device 14 comprises one sensor 16 per conductor 24 of main energy supply 6. Conductors 24 comprise three-phase conductors $24_{P1, P2, P3}$ and one neutral conductor $24_N$.

Figure 7:
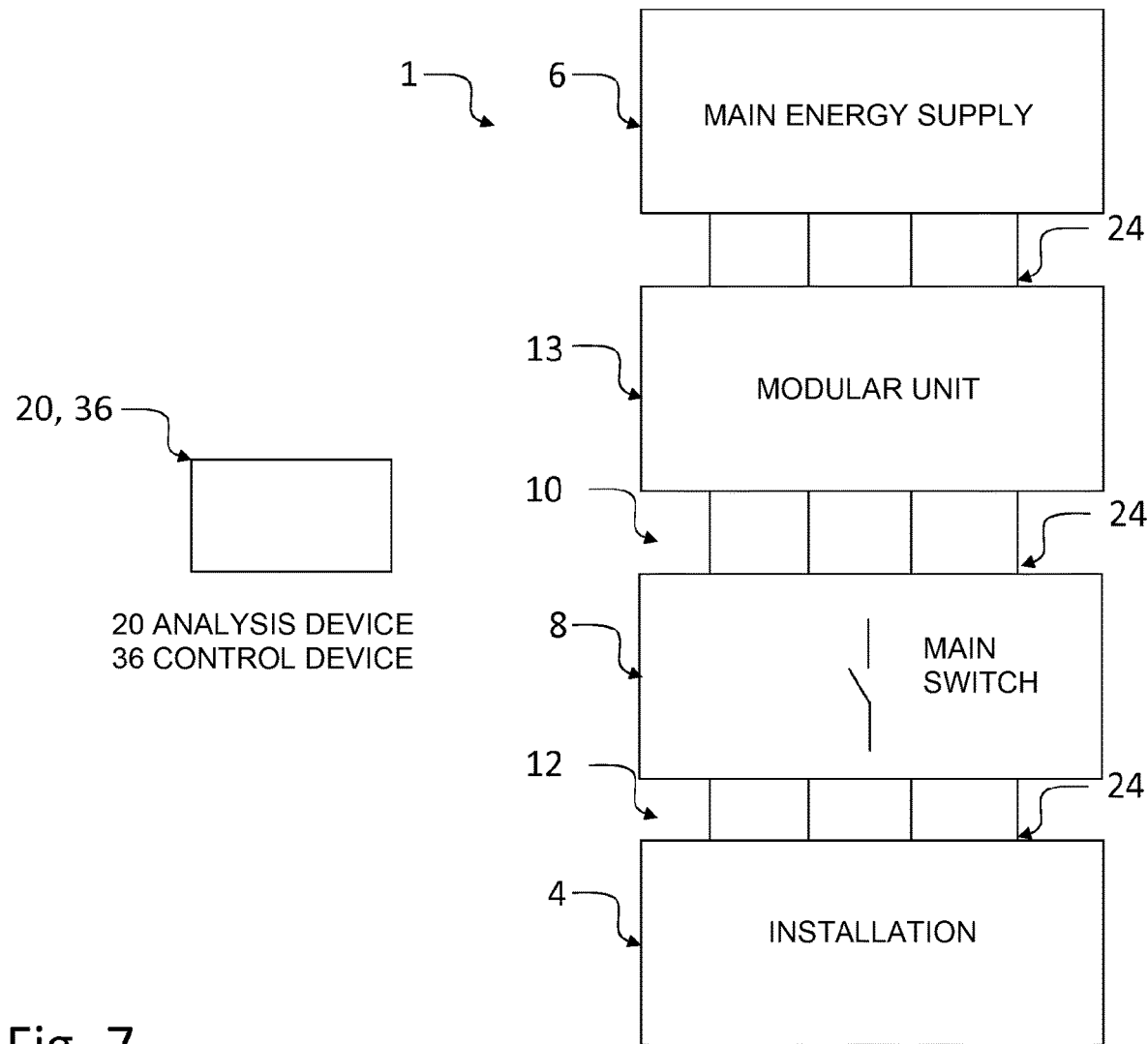

FIG. 7 shows a further embodiment of system 1 according to the first and the second aspect of the invention, wherein in this embodiment an analysis and control device 20, 36 overriding system 1 is represented. Control device 34 (not shown, see FIG. 2, 3, 4, 6) of modular unit 13 communicates via communication device 18 (not shown, see FIG. 2, 3, 4, 6) with analysis and control device 20, 36 overriding system 1. Overriding analysis and control device 20, 36 can thus coordinate control device 34 of a plurality of systems. The analysis of the measured current with regard to the state of the passenger conveyance installation of system 1 and of further systems 1 (second aspect of the invention) also takes place centrally in overriding analysis and control device 20, 36.

Figure 8:
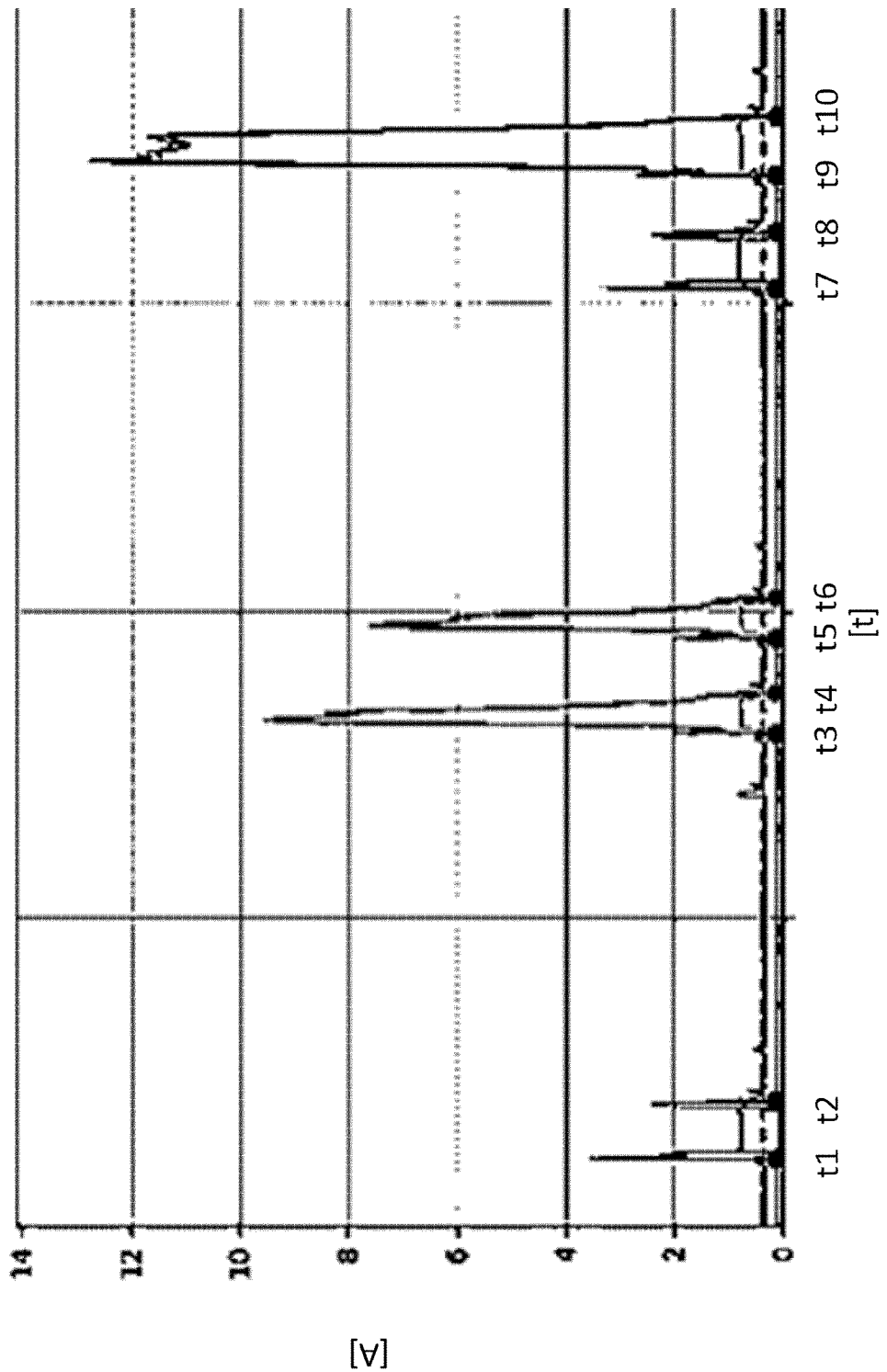
FIG. 8: shows an illustrative and diagrammatic profile of a current profile of the system measured by the modular unit.

FIG. 8 shows a profile of the electrical parameter (current) [A] measured by measuring device 14 (not shown, see FIGS. 2-4 and 6). In FIG. 8, the start of a trip of the elevator installation is marked by a first dot and the stop of a trip with a second dot. Five trips are represented in FIG. 8. The dashed line shows the standby current in the standby operation. Furthermore, the three phase conductor currents are shown with continuous lines, which in large parts overlap. It can be seen that the pulse length and the amplitudes of the trips differ. At the start and at the end of each trip, a door movement can be recognized in the current profile.

Figure 9:
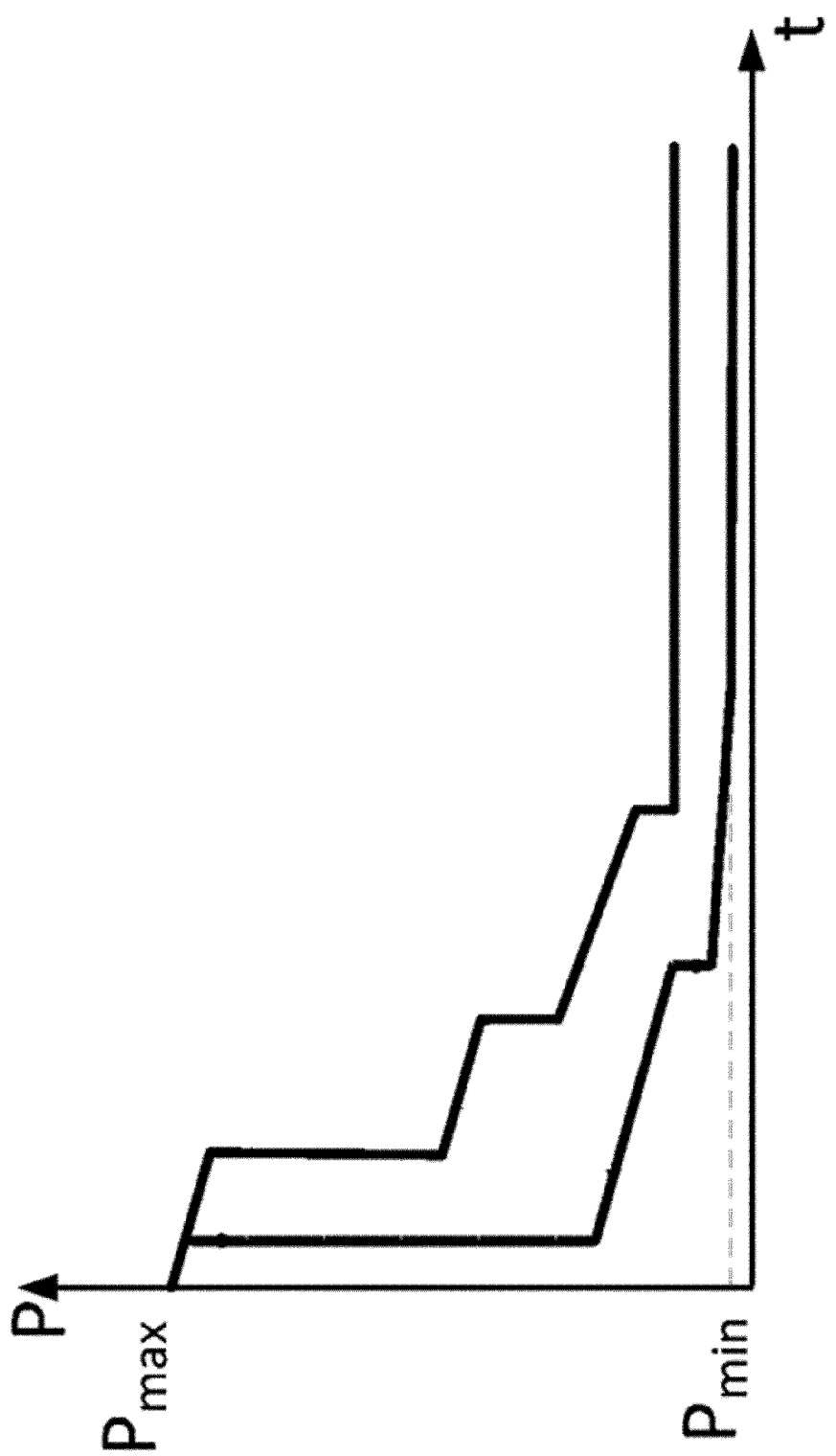
FIG. 9: shows an illustrative and diagrammatic profile of a power profile of the system measured by the modular unit.

FIG. 9 shows two profiles of the electric parameter P measured by measuring device 14 (not shown, see FIGS. 2-4 and 6), which in this embodiment is an electrical power. A first drop in the consumed power can be seen in FIG. 9, this drop relating to the extinguishing of the car lighting. A second drop of the consumed power takes place due to the switching-off of the door drives. A third drop results from the switching-off of the ventilation. The installation then transfers slowly into the standby operation, in which it switches off further small auxiliary consumers and/or operates them in the economy operation.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A system for conveying passengers, the system including a passenger conveyance installation being one of an elevator, an escalator and a moving walkway in a building, and the system including a first control device for controlling the passenger conveyance installation, the system comprising:

a main energy supply in the building for supplying the passenger conveyance installation with electrical energy;

a main switch for disconnecting the passenger conveyance installation from the main energy supply, wherein the main switch is arranged in the building and has an input side and an output side, wherein the input side is connected to the main energy supply and the output side is connected to the passenger conveyance installation;

a measuring device having a sensor for measuring an electrical parameter;

a converter having a direct current side and an alternating current side;

an energy store electrically connected to the direct current side of the converter;

a second control device for controlling the converter, wherein the second control device is different from the first control device; and wherein the sensor is at least one of electrically and electromagnetically connected to the main energy supply at the input side of the main switch and the alternating current side of the converter is electrically connected to the main energy supply.

2. The system according to claim 1 wherein the system includes at least two of the passenger conveyance installation, the main energy supply supplies electrical energy to the at least two passenger conveyance installations, and the at least two passenger conveyance installations are adapted to be disconnected from the main energy supply by the main switch.

3. The system according to claim 1 wherein the converter permits a bidirectional energy flow between the main energy supply and the energy store.

4. The system according to claim 1 wherein the measuring device includes at least two of the sensor, each of the at least two sensors being connected at the input side of the main switch to an associated one of a phase conductor and a neutral conductor of the main energy supply.

5. The system according to claim 1 wherein at least one of the measuring device and the second control device is supplied with electrical energy by at least one of the main energy supply and the energy store.

6. The system according to claim 1 wherein at least two of the measuring device, the converter, the energy store and the second control device are formed as a modular unit.

7. The system according to claim 1 including at least one of a communication device for communication of a charging state of the energy store and an analysis device for analyzing the charging state of the energy store.

8. A method for optimizing an energy consumption by a system for conveying passengers in a building, wherein the system includes a passenger conveyance installation being one of an elevator, an escalator and a moving walkway, the method comprising the steps of:

identification of a conductor via which the passenger conveyance installation in a standby operation is supplied with a standby current from a main energy supply of the building;

measurement of an electrical parameter of current flowing in the identified conductor at an input side of a main switch, the identified conductor being connected to the main energy supply at the input side of the main switch and being connected at an output side of the main switch to the passenger conveyance installation;

detection of a standby operation of the passenger conveyance installation using the measured electrical parameter and performing of the following steps as soon as the passenger conveyance installation is in the standby operation;

continuous measurement of a standby current in the identified conductor; and supply from an energy store of the system a current corresponding to the measured standby current into the identified conductor at the input side of the main switch.

9. The method according to claim 8 including a step of charging the energy store with electrical energy drawn from the main energy supply at the input side of the main switch.

10. The method according to claim 8 including a step of receiving control information and controlling at least one of charging-up the energy store from the main energy supply and supplying electrical energy from the energy store based upon the control information.

11. The method according to claim 8 including steps of monitoring a charging state of the energy store and communicating the charging state to an analysis device adapted to override the system and that is set apart from the system.

12. The method according to claim 11 wherein during the step of supplying current from the energy store, the energy store supplies feed-in power that corresponds to a standby power required by the passenger conveyance installation.

13. A method for reducing energy consumption of a passenger conveyance installation in a building during a standby operation of the installation, the method comprising the steps of:

installing an energy store at an input side of a main switch arranged in the building, the main switch being connected at an input side to a main energy supply of the building and at an output side to the passenger conveyance installation; and providing electrical energy from the energy store to the passenger conveyance installation during a standby operation of the passenger conveyance installation whereby an energy consumption of the passenger conveyance installation from the main energy supply is reduced.

14. The system according to claim 2 including a third control device coordinating operations of the second control devices of the at least two passenger conveyance installations.

* * * * *